(12) United States Patent
Nishida et al.

(10) Patent No.: US 9,726,189 B2
(45) Date of Patent: Aug. 8, 2017

(54) TURBOCHARGER AND METHOD OF MANUFACTURING FLOATING BUSH

(75) Inventors: Hideaki Nishida, Tokyo (JP); Keitaro Kamata, Tokyo (JP); Isao Tomita, Tokyo (JP); Takashi Shiraishi, Tokyo (JP); Noriyuki Hayashi, Tokyo (JP); Motoki Ebisu, Tokyo (JP); Hiroshi Suzuki, Tokyo (JP); Hiroshi Ogita, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 772 days.

(21) Appl. No.: 13/993,275

(22) PCT Filed: Feb. 13, 2012

(86) PCT No.: PCT/JP2012/053254
§ 371 (c)(1),
(2), (4) Date: Jul. 10, 2013

(87) PCT Pub. No.: WO2012/132586
PCT Pub. Date: Oct. 4, 2012

(65) Prior Publication Data
US 2014/0010647 A1    Jan. 9, 2014

(30) Foreign Application Priority Data

Mar. 29, 2011    (JP) ................... 2011-073599

(51) Int. Cl.
*F04D 29/05* (2006.01)
*F04D 29/056* (2006.01)
(Continued)

(52) U.S. Cl.
CPC ............. *F04D 29/056* (2013.01); *F01D 1/24* (2013.01); *F01D 25/16* (2013.01); *F01D 25/162* (2013.01);
(Continued)

(58) Field of Classification Search
CPC .... F01D 25/164; F01D 25/166; F16C 17/028; F16C 17/18; F16C 33/14; F16C 43/02;
(Continued)

(56) References Cited

U.S. PATENT DOCUMENTS 3,158,924 A * 12/1964 Bowhill .................... B60T 8/26
29/898.02
3,201,183 A * 8/1965 Buske ...................... F16C 33/06
384/286
(Continued)

FOREIGN PATENT DOCUMENTS

CH        272 901 A      1/1951
CN     101410637 A      4/2009
(Continued)

OTHER PUBLICATIONS

Stoenner, German Patent DE3936069 Turbocharger Bearing (Translation generated by FLS, Inc. for the United States Patent Office, 1991.*
(Continued)

*Primary Examiner* — Craig Kim
*Assistant Examiner* — Eldon Brockman
(74) *Attorney, Agent, or Firm* — Birch, Stewart, Kolasch & Birch, LLP

(57) ABSTRACT

A turbocharger and a method of manufacturing a floating bush with which noise can be reduced, and the rotation speed can be increased. In a turbocharger in which a rotating shaft having a circular cross-section and connecting a turbine rotor and a compressor rotor is supported in a freely rotatable manner, at two axially separated positions via floating bushes, by an inner circumferential surface disposed so as to surround the rotating shaft in a bearing housing, an inner circumferential surface of each of the floating bushes (Continued)

has a non-circular shape in which the curvature of the cross-sectional shape varies in the circumferential direction.

4 Claims, 5 Drawing Sheets

(51) Int. Cl.

| | | |
|---|---|---|
| F16C 17/18 | (2006.01) | |
| F16C 43/02 | (2006.01) | |
| F16C 33/10 | (2006.01) | |
| F01D 25/16 | (2006.01) | |
| F01D 1/24 | (2006.01) | |
| F01D 25/18 | (2006.01) | |
| F16C 17/02 | (2006.01) | |
| F16C 17/26 | (2006.01) | |
| F16C 33/14 | (2006.01) | |

(52) U.S. Cl.
CPC ......... *F01D 25/166* (2013.01); *F01D 25/186* (2013.01); *F16C 17/028* (2013.01); *F16C 17/18* (2013.01); *F16C 17/26* (2013.01); *F16C 33/1075* (2013.01); *F16C 33/14* (2013.01); *F16C 43/02* (2013.01); *F05D 2220/40* (2013.01); *F05D 2250/14* (2013.01); *F05D 2250/70* (2013.01); *F05D 2260/96* (2013.01); *F16C 2220/40* (2013.01); *F16C 2220/60* (2013.01); *F16C 2220/70* (2013.01); *F16C 2360/24* (2013.01); *Y10T 29/49668* (2015.01)

(58) Field of Classification Search
CPC .............. F16C 2220/60; F16C 2220/62; F05D 2250/14; F05D 2240/53
See application file for complete search history.

(56) References Cited

U.S. PATENT DOCUMENTS

| | | | | |
|---|---|---|---|---|
| 7,566,174 | B2* | 7/2009 | Kurimura | ............. F16C 17/107 384/100 |
| 2006/0120643 | A1* | 6/2006 | Kurimura | ............. F16C 17/026 384/119 |
| 2007/0230843 | A1* | 10/2007 | Kurimura | ............. F16C 17/107 384/130 |
| 2009/0110572 | A1* | 4/2009 | Meacham | ................ F02C 6/12 417/406 |

FOREIGN PATENT DOCUMENTS

| | | |
|---|---|---|
| DE | 39 36 069 A1 | 5/1991 |
| JP | 61-88021 A | 5/1986 |
| JP | 61-206823 A | 9/1986 |
| JP | 64-47938 U | 3/1989 |
| JP | 1-193409 A | 8/1989 |
| JP | 10-2227 A | 1/1998 |
| JP | 2000-145781 A | 5/2000 |
| JP | 2002-213450 A | 7/2002 |
| JP | 2002-276646 A | 9/2002 |
| JP | 2003-232353 A | 8/2003 |
| JP | 2004-285887 A | 10/2004 |
| JP | 2006-153122 A | 6/2006 |
| JP | 2007-127063 A | 5/2007 |
| JP | 2007-205209 A | 8/2007 |
| JP | 2007-285252 A | 11/2007 |
| JP | 2008-111502 A | 5/2008 |
| JP | 2008-286050 A | 11/2008 |
| JP | 2008-291810 A | 12/2008 |
| JP | 2009-7935 A | 1/2009 |
| JP | 2009-156333 A | 7/2009 |
| JP | 2009-167872 A | 7/2009 |
| JP | 2010-133530 A | 6/2010 |
| JP | 2010-174811 A | 8/2010 |
| JP | 2010-223237 A | 10/2010 |
| WO | WO 91/14874 A1 | 10/1991 |

OTHER PUBLICATIONS

Office Action issued Nov. 15, 2014 in corresponding Chinese Application No. 201280004095.3 with an English translation.
Notification of the Decision to Grant a Patent Right for Patent for Invention issued on Dec. 15, 2015 in corresponding Chinese Patent Application No. 201280004095.3 with an English Translation.
Decision to Grant a Patent issued on Apr. 8, 2014 for Japanese Patent Application 2011-073599.
Extended European Search Report issued Jun. 30, 2015 for European Patent Application No. 12765099.2.
Office Action issued Nov. 15, 2016 in corresponding European Patent Application No. 12765099.2.

* cited by examiner

TURBOCHARGER AND METHOD OF MANUFACTURING FLOATING BUSH

TECHNICAL FIELD

The present invention relates to a turbocharger and a method of manufacturing a floating bush used in this turbocharger.

BACKGROUND ART

A turbocharger supplies compressed air to an engine using energy of exhaust gas from the engine. The turbocharger includes a turbine rotor rotated by the exhaust gas from the engine and a compressor rotor rotated by rotation of the turbine rotor. The compressor rotor compresses air introduced from the outside and supplies the air to the engine.

Typically, a rotating shaft connecting the turbine rotor and the compressor rotor is supported by a housing via floating bush bearings in a freely rotatable manner (see PTL 1).

The floating bush bearing includes a floating bush rotatably disposed between the rotating shaft and the housing. Pressurized lubricating oil is supplied from the housing to a space between the inner circumferential surface of the housing and the outer circumferential surface of the floating bush and to a clearance provided between the inner circumferential surface of the floating bush and the rotating shaft through a radially extending oil supply path provided in the floating bush. The rotating shaft is configured to be supported by a lubricating oil film formed in these clearances.

CITATION LIST

Patent Literature

{PTL 1} Japanese Unexamined Patent Application, Publication No. 2008-286050

SUMMARY OF INVENTION

Technical Problem

In the conventional turbocharger, the cross-sections of the rotating shaft, the inner and outer circumferential surfaces of the floating bush, and the inner circumferential surfaces of the housing are circular. In such a turbocharger, because the coupling term of an oil film spring becomes larger in accordance with an increase in rotational speed of the rotating shaft, vibration of the rotating shaft increases, leading to a problem that noise is generated.

In particular, small turbochargers, which employ high-speed, low-load bearing systems, tend to suffer from this vibration. Therefore, it is difficult to further increase the rotation speed, limiting improvements in performance.

The present invention has been made in view of these circumstances, and an object thereof is to provide a turbocharger and a method of manufacturing a floating bush with which noise can be reduced, and the rotation speed can be increased.

Solution to Problem

To solve the above-described problems, the present invention provides the following means.

That is, a first aspect of the present invention is a turbocharger in which a rotating shaft having a circular cross-section and connecting a turbine rotor and a compressor rotor is supported in a freely rotatable manner, at two axially separated positions via floating bushes, by a support portion disposed so as to surround the rotating shaft in a housing. An inner circumferential surface of each of the floating bushes has a non-circular shape in which the curvature of the cross-section varies in the circumferential direction.

In the turbocharger according to this aspect, because the inner circumferential surface of the floating bush, which supports the rotating shaft having a circular cross-section with an oil film disposed therebetween, has a non-circular shape in which the curvature of the cross-section varies in the circumferential direction, the coupling term of the oil film spring can be made smaller compared with the relationship in the conventional configuration in which circular shapes are combined. If the coupling term of the oil film spring can be made smaller in this manner, unstable vibration of the rotating shaft can be suppressed, and consequently, noise can be reduced. Hence, because it is possible to increase the rotation speed of the rotating shaft, the performance of the turbocharger can be improved.

In the above aspect, an outer circumferential surface of each of the floating bushes may have a non-circular shape in which the curvature of the cross-section varies in the circumferential direction.

With this configuration, because the coupling term of the oil film spring formed by the oil film between the support portion in the housing having a circular cross-section and the outer circumferential surfaces of the floating bushes can be made small, unstable vibration of the floating bushes can be suppressed. Accordingly, because unstable vibration of the rotating shaft can be more effectively suppressed, noise can be more effectively reduced.

In the above aspect, an inner circumferential surface of the support portion may have a non-circular shape in which the curvature of the cross-section varies in the circumferential direction.

With this configuration, because the coupling term of the oil film spring formed by the oil film between the housing and the circular outer circumferential surfaces of the floating bushes can be made small, unstable vibration of the floating bushes can be reduced. Accordingly, because unstable vibration of the rotating shaft can be more effectively suppressed, noise can be more effectively reduced.

A second aspect of the present invention is a turbocharger in which a rotating shaft having a circular cross-section and connecting a turbine rotor and a compressor rotor is supported in a freely rotatable manner, at two axially separated positions via floating bushes, by a support portion disposed so as to surround the rotating shaft in a housing. An inner circumferential surface of the support portion has a non-circular shape in which the curvature of the cross-section varies in the circumferential direction.

In the turbocharger according to this aspect, because the inner circumferential surface of the support portion, which supports the outer circumferential surfaces of the floating bushes having a circular cross-section via the oil film, has a non-circular shape in which the curvature of the cross-section varies in the circumferential direction, the coupling term of the oil film spring can be made smaller compared with the relationship in the conventional configuration in which both have circular shapes. If the coupling term of the oil film spring can be made smaller in this manner, unstable vibration of the floating bushes can be suppressed, and consequently, unstable vibration of the rotating shaft can be suppressed, and noise can be reduced. Thus, it is possible to increase the rotation speed of the rotating shaft.

In the first and second aspects above, the non-circular shape may be an elliptical shape.

Because the curvature of the cross-section continuously varies in the circumferential direction in an elliptical shape, an abrupt change of the oil film spring can be suppressed.

For example, in an elliptical shape, the radius of curvature of the central portions of a pair of arcs on both sides of the long axis, including portions intersecting with the short axis, is larger (i.e., the curvature thereof is smaller) than the radius of curvature of a circle centered at the intersection between the long axis and the short axis. Thus, an inlet portion of the clearance formed with respect to the rotating shaft, through which the lubricating oil flows, is larger than that in the case where the inner circumferential surface has a circular shape. Hence, the reaction force of the oil film acts at a position closer to the center of the axis of the rotating shaft, compared with the case where the inner circumferential surface has a circular shape, and thus, the component of the force acting in the direction in which the rotating shaft is vibrated, i.e., the component due to the coupling term, becomes even smaller.

It is desirable to employ a shape in which a portion having a larger radius of curvature than a circle concentric therewith occupies at least 50%, more preferably, 70%, of the entire circumference.

In the above configuration, a pair of the floating bushes may be connected together, and the phases of the ellipses formed on the inner circumferential surfaces of the floating bushes may be shifted from each other.

Because the pair of floating bushes are connected together, the floating bushes are rotated together about the rotating shaft.

At this time, because the phases of the ellipses formed on the inner circumferential surfaces of the floating bushes are shifted from each other, the directions in which the force vibrating the rotating shaft act differ between the floating bushes. Accordingly, the vibration can be reduced by mutual interference.

A third aspect of the present invention is a method of manufacturing a floating bush that supports a rotating shaft having a circular cross-section and connecting a turbine rotor and a compressor rotor, the floating bush having an inner circumferential surface that has a non-circular cross-section. The method includes deforming a cylindrical member into a flattened shape by applying pressing forces to side surface thereof from two opposing directions with respect to the axis; forming a hole having a circular shape centered on the axis so as to penetrate the deformed cylindrical member; and removing the pressing forces.

In the method of manufacturing a floating bush according to this aspect, the cylindrical member is deformed into a flattened shape by applying pressing forces to side surface thereof from two opposing directions with respect to the axis. Next, a hole having a circular shape centered on the axis is formed so as to penetrate the deformed cylindrical member. Then, upon removal of the pressing forces, the cylindrical member pressed from the two directions returns to its original state. As a result, the cross-section of the outer circumferential surface becomes circular, and the cross-section of the hole becomes non-circular due to being stretched in the two directions.

In this manner, a floating bush whose inner circumferential surface has a non-circular cross-section can be easily manufactured.

Advantageous Effects of Invention

With the turbocharger according to the present invention, unstable vibration of the rotating shaft can be suppressed, and noise can be reduced. Hence, because it is possible to increase the rotation speed of the rotating shaft, the performance of the turbocharger can be improved.

Furthermore, with the method of manufacturing a floating bush of the present invention, the floating bush whose inner circumferential surface has a non-circular cross-section can be easily manufactured.

DESCRIPTION OF EMBODIMENTS

Embodiments of the present invention will be described below with reference to the drawings.

First Embodiment

A turbocharger according to a first embodiment of the present invention will be described in detail below using FIGS. 1 to 6.

Figure 1:
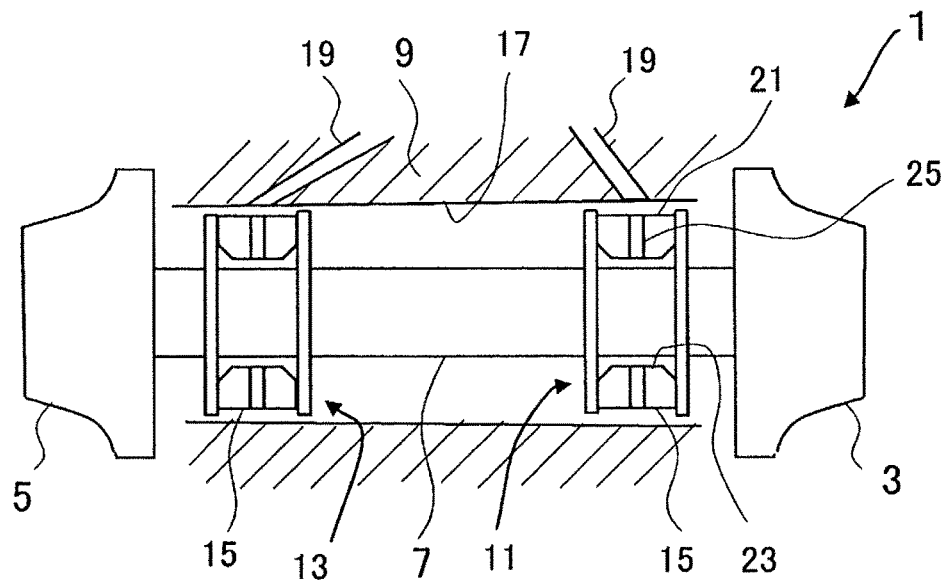
FIG. 1 is a block diagram for explaining the configuration of a turbocharger according to a first embodiment of the present invention.
Figure 2:
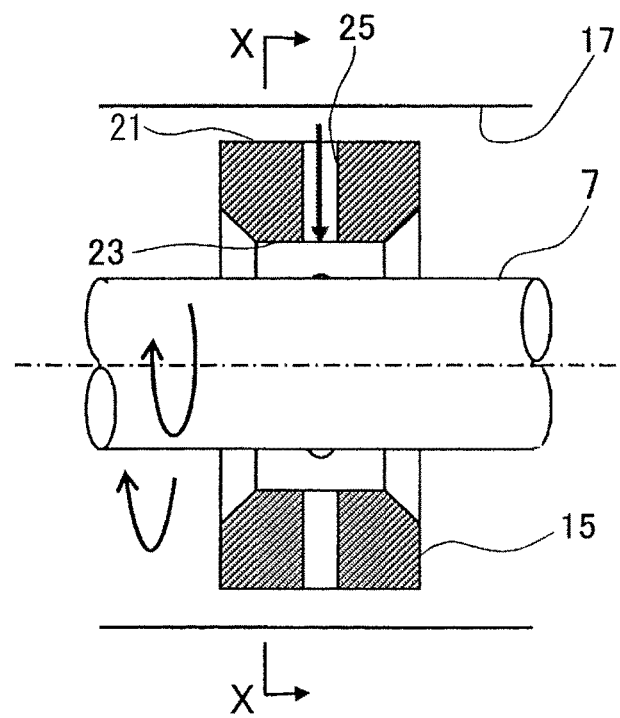
FIG. 2 is a longitudinal sectional view for explaining the configuration of a floating bush bearing in FIG. 1.
Figure 3:
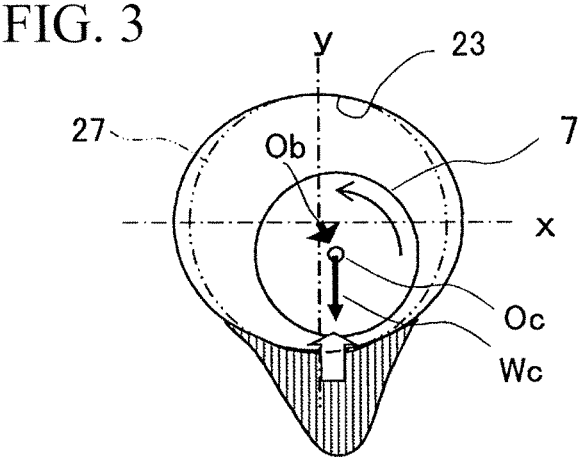
FIG. 3 is a cross-sectional view taken along line X-X in FIG. 2.

FIG. 1 is a block diagram for explaining the configuration of the turbocharger according to the first embodiment of the present invention. FIG. 2 is a longitudinal sectional view for explaining the configuration of the floating bush bearing in FIG. 1. FIG. 3 is a cross-sectional view taken along line X-X in FIG. 2.

A turbocharger 1 includes a turbine rotor 3 rotated by exhaust gas from the engine, a compressor rotor 5 that compresses air introduced from the outside and supplies the air to the engine, a rotating shaft 7 connecting the turbine rotor 3 and the compressor rotor 5, a bearing housing (housing) 9 that rotatably supports the rotating shaft 7, a turbine-side floating bush bearing 11 disposed around the rotating shaft 7, at a portion on the side of the turbine rotor 3, and a compressor-side floating bush bearing 13 disposed around the rotating shaft 7, at a portion on the side of the compressor rotor 5.

The turbine-side floating bush bearing 11 and the compressor-side floating bush bearing 13 are each configured such that a floating bush 15 is rotatably disposed between the rotating shaft 7 and the bearing housing 9. Furthermore, each floating bush 15 is attached such that movement thereof in the axial direction is limited. Thus, the rotating shaft 7 is supported by the bearing housing 9 via the two axially separated floating bushes 15, i.e., one in the turbine-side floating bush bearing 11 and the other in the compressor-side floating bush bearing 13.

The bearing housing 9 has oil paths 19 through which lubricating oil is supplied to a space between an inner circumferential surface (support portion) 17 of the bearing housing 9 and outer circumferential surfaces 21 of the floating bushes 15.

Each floating bush 15 has a plurality of oil-supply holes 25 communicating between the outer circumferential surface 21 and an inner circumferential surface 23, at certain intervals in the circumferential direction.

The oil-supply holes 25 serve to deliver the lubricating oil, supplied to the space between the inner circumferential surface 17 of the bearing housing 9 and the outer circumferential surface 21 of the floating bush 15, to a space between the inner circumferential surface 23 of the floating bush 15 and the rotating shaft 7.

As shown in FIG. 3, the inner circumferential surface 23 of the floating bush 15 has an elliptical (non-circular) cross-section.

This elliptical shape is formed by pulling a circular shape 27 having the same center Ob in the x direction. Accordingly, the relationship between the inner circumferential surface 23 of the floating bush 15 and the rotating shaft 7 is a combination of a non-circular shape and a circular shape.

The operation of the thus-configured turbocharger 1 will be described.

Exhaust gas from the engine is introduced into the turbine rotor 3, rotates the turbine rotor 3, and is discharged to the outside.

The rotation of the turbine rotor 3 is transmitted to the compressor rotor 5 via the rotating shaft 7 to rotate the compressor rotor 5. The rotating compressor rotor 5 compresses air introduced from the outside and supplies the compressed air to the engine.

At this time, in the turbine-side floating bush bearing 11 and the compressor-side floating bush bearing 13, pressurized lubricating oil is supplied to the space between the inner circumferential surface 17 of the bearing housing 9 and the outer circumferential surfaces 21 of the floating bushes 15 through the oil paths 19. Furthermore, the lubricating oil is supplied, through the oil-supply holes 25, to clearances formed between the inner circumferential surfaces 23 of the floating bushes 15 and the rotating shaft 7.

Thus, the floating bushes 15 are supported by the bearing housing 9 with an oil film disposed therebetween, and the rotating shaft 7 is supported by the floating bushes 15 with an oil film disposed therebetween.

As the rotating shaft 7 rotates, the rotating shaft 7 entrains the lubricating oil film formed in the clearance between the inner circumferential surfaces 23 and the rotating shaft 7. As a result, the lubricating oil moves, and in accordance with that, the floating bushes 15 are rotated in the direction in which the rotating shaft 7 rotates. Typically, the rotating shaft 7 and the floating bushes 15 are rotated at different speeds.

Although the clearance becomes smallest at a position corresponding to a direction Wc in which the load is applied to the rotating shaft 7, because the volume of the oil film increases as the rotating shaft 7 entrains the lubricating oil, a reaction force sufficient to support the rotating shaft 7 is produced.

This reaction force functions as an oil film spring and is expressed as follows, where Fx is a force in the x direction, and Fy is a force in the y direction.

$$\begin{pmatrix} Fx \\ Fy \end{pmatrix} = \begin{pmatrix} Kxx & Kxy \\ Kyx & Kyy \end{pmatrix} \begin{pmatrix} x \\ y \end{pmatrix} \quad \{\text{Expression 1}\}$$

Herein, x denotes a displacement in the x direction, y denotes a displacement in the y direction, and Kxx denotes a spring constant acting in the x direction when moved in the x direction. Kyy denotes a spring constant acting in the y direction when moved in the y direction. Kxy denotes a spring constant acting in the y direction when moved in the x direction. Kyx denotes a spring constant acting in the x direction when moved in the y direction.

Kxy and Kyx are coupling terms.

Figure 4:
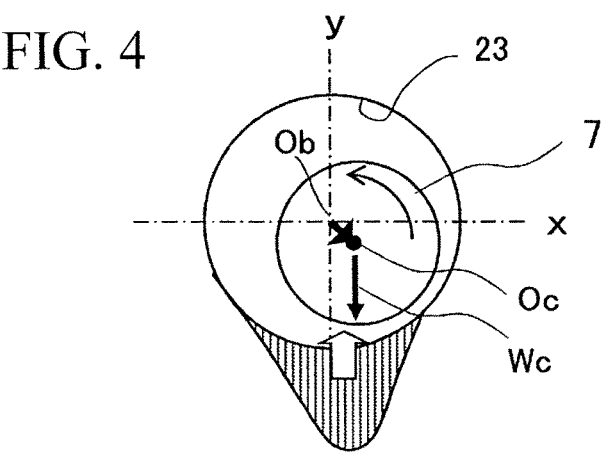
FIG. 4 is a cross-sectional view of a part of the conventional floating bush bearing corresponding to the part shown in FIG. 3.

As in the conventional floating bush 15 shown in FIG. 4, if circular shapes, i.e., the rotating shaft 7 having a circular cross-section and the inner circumferential surface 23 of the floating bush 15 having a circular cross-section, are combined, the coupling terms of the oil film spring become larger. If the coupling terms exist, a force in the y direction is generated when moved in the x direction, and a force in the x direction is generated when moved in the y direction, resulting in unstable vibration of the rotating shaft 7.

As the coupling terms become larger, unstable vibration of the rotating shaft 7 becomes larger.

In this embodiment, because the relationship between the inner circumferential surface 23 of the floating bush 15 and the rotating shaft 7 is a combination of a non-circular shape and a circular shape, the coupling terms, Kxy and Kyx, of the oil film spring can be made smaller compared with the relationship in the conventional configuration in which circular shapes are combined.

If the coupling terms, Kxy and Kyx, of the oil film spring can be made smaller in this manner, unstable vibration of the rotating shaft 7 can be suppressed, and consequently, noise can be reduced. Hence, because it is possible to increase the rotation speed of the rotating shaft 7, the performance of the turbocharger 1 can be improved.

Furthermore, because the inner circumferential surface 23 of the floating bush 15 has an elliptical cross-section, i.e., the curvature continuously varies in the circumferential direction, an abrupt change of the oil film spring can be suppressed.

In an elliptical shape, the radius of curvature of the central portions of a pair of arcs on both sides of the long axis, including portions intersecting with the short axis, is larger (i.e., the curvature thereof is smaller) than the radius of curvature of a circle centered at the intersection Ob between the long axis and the short axis. Thus, an inlet portion of the clearance formed with respect to the rotating shaft 7, through which the lubricating oil flows, is larger than that in the case where the inner circumferential surface 23 has a circular shape. Hence, the reaction force of the oil film acts at a position closer to the center of the axis Oc of the rotating shaft 7, compared with the case where the inner circumferential surface 23 has a circular shape, and thus, the component of the force acting in the direction in which the rotating shaft 7 is vibrated, i.e., the component due to the coupling term, becomes even smaller.

It is desirable to employ a shape in which a portion having a larger radius of curvature than a circle concentric therewith occupies at least 50%, more preferably, 70%, of the entire circumference.

Next, a method of manufacturing the floating bush 15 will be described using FIGS. 5 and 6.

Figure 5:
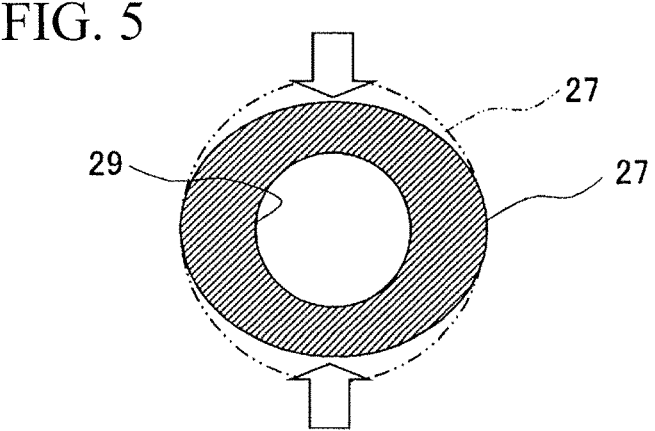
FIG. 5 is a cross-sectional view showing a step in manufacturing the floating bush in FIG. 1.

As shown in FIG. 5, a cylindrical member 27, illustrated by a two-dot chain line, is deformed into a flattened shape by applying pressing forces to a side surface thereof from two opposing directions (above and below) with respect to the axis.

Next, a hole 29 having a circular shape centered on the axis is formed so as to penetrate the deformed cylindrical member 27, illustrated by a solid line.

Figure 6:
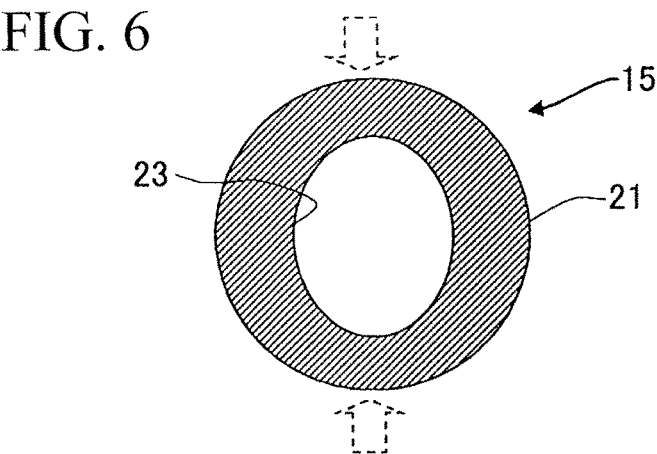
FIG. 6 is a cross-sectional view showing a step in manufacturing the floating bush in FIG. 1.

Then, upon removal of the pressing force, as shown in FIG. 6, the cylindrical member 27 pressed from above and below returns to its original state. As a result, the cross-section of the outer circumferential surface 21 becomes circular, and the cross-section of the hole 29 becomes non-circular due to being stretched upward and downward.

In this manner, the floating bush 15 whose inner circumferential surface 23 has an elliptical (non-circular) cross-section can be easily manufactured.

Although the non-circular cross-section of the inner circumferential surface 23 is represented by an elliptical shape in this embodiment, it is not limited thereto.

Figure 7:
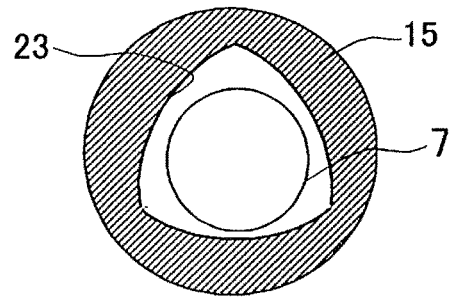
FIG. 7 is a cross-sectional view showing another embodiment of the floating bush in FIG. 1.
Figure 8:
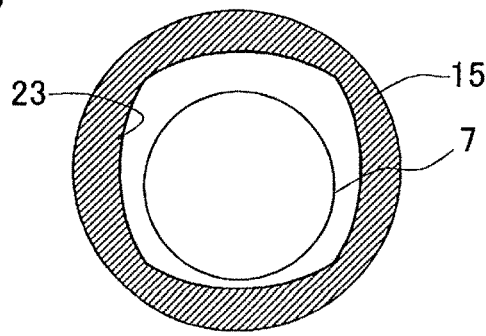
FIG. 8 is a cross-sectional view showing still another embodiment of the floating bush in FIG. 1.

For example, a three-arc shape as shown in FIG. 7, a four-arc shape as shown in FIG. 8, or multi-arc shape having five or more arch-shaped portions is also possible. By employing such a shape, it is possible to increase the proportion of a portion having a larger radius of curvature than a circle concentric therewith.

Furthermore, a two-arc shape may be employed. In addition, the arch-shaped portions of a multi-arc shape may be smoothly connected.

Figure 9:
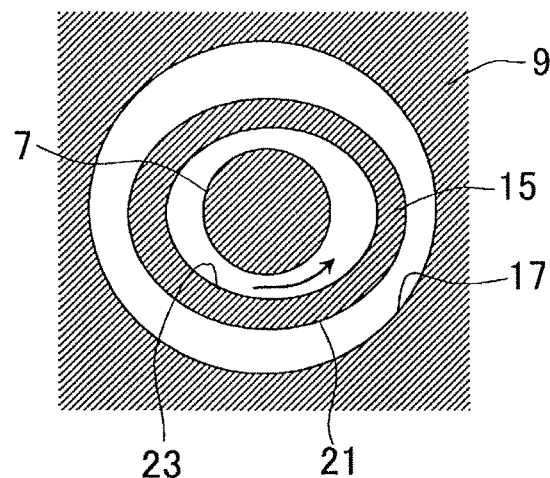
FIG. 9 is a cross-sectional view showing still another form of the floating bush bearing according to the first embodiment of the present invention.

Although the inner circumferential surface 23 of the floating bush 15 has a non-circular shape in this embodiment, in addition to this, the outer circumferential surface 21 of the floating bush 15 may also have a non-circular shape, as shown in FIG. 9.

With this configuration, because the coupling term of the oil film spring formed by the oil film between the inner circumferential surface 17 of the bearing housing 9 having a circular cross-section and the outer circumferential surface 21 of the floating bush 15 can be made small, unstable vibration of the floating bushes 15 can be suppressed. Accordingly, unstable vibration of the rotating shaft 7 can be more effectively suppressed, and consequently, noise can be more effectively reduced.

Second Embodiment

Next, a turbocharger 1 according to a second embodiment of the present invention will be described using FIG. 10.

In this embodiment, the configurations of the inner circumferential surface 17 of the bearing housing 9 and the inner circumferential surface 23 of the floating bush 15 are different from those according to the first embodiment. Hence, such different portions will be mainly described here, while omitting overlapping descriptions of the portions having the same configurations as those in the above-described first embodiment. Note that the members that are the same as those in the first embodiment will be denoted by the same reference numerals.

Figure 10:
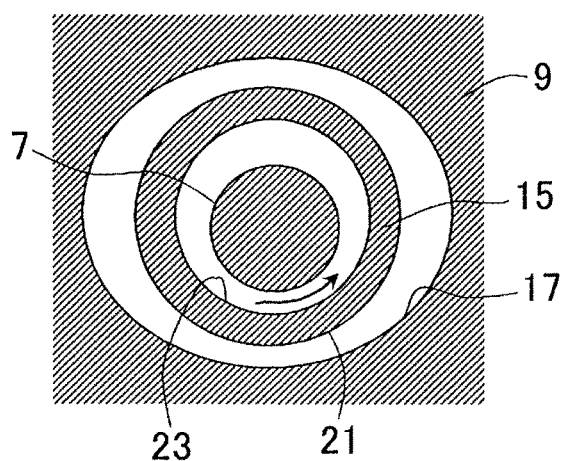
FIG. 10 is a cross-sectional view showing a floating bush bearing according to a second embodiment of the present invention.

FIG. 10 is a cross-sectional view of the turbine-side floating bush bearing 11 (compressor-side floating bush bearing 13) according to this embodiment.

In this embodiment, the inner circumferential surface 23 of the floating bush 15 has a circular cross-section.

On the other hand, the inner circumferential surface 17 of the bearing housing 9 has an elliptical cross-section.

In this embodiment having this configuration, because the inner circumferential surface 17 of the bearing housing 9, which supports the outer circumferential surface 21 of the floating bush 15 having a circular cross-section via the oil film, has an elliptical shape, the coupling term of the oil film spring can be made smaller compared with the relationship in the conventional configuration in which both have circular shapes.

If the coupling term of the oil film spring can be made smaller in this manner, unstable vibration of the floating bushes 15 can be suppressed, and consequently, unstable vibration of the rotating shaft can be suppressed, and noise can be reduced. Thus, it is possible to increase the rotation speed of the rotating shaft.

Figure 11:
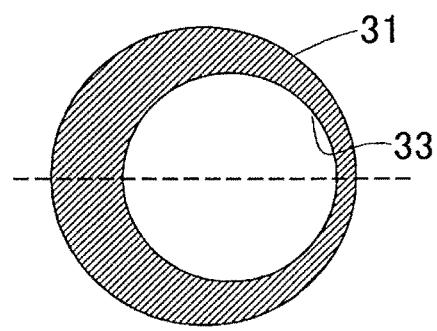
FIG. 11 is a cross-sectional view showing a step in manufacturing a housing according to the second embodiment of the present invention.

Next, a method of forming the inner circumferential surface 17 of the bearing housing 9 will be described using FIGS. 11 and 12.

A description here will be given based on an assumption that the bearing housing 9 has a cylindrical shape. As shown in FIG. 11, the cylindrical member 31 is machined such that a hole 33 whose axis is shifted from the axis of the cylindrical member 31 penetrates therethrough.

The machined cylindrical member 31 is cut into two along a line connecting the axis of the cylindrical member 31 and the axis of the hole 33, thereby forming halved members 35.

Figure 12:
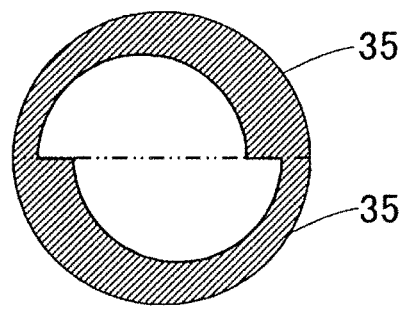
FIG. 12 is a cross-sectional view showing a step in manufacturing the housing according to the second embodiment of the present invention.

One of the halved members 35 is rotated about a direction perpendicular to the axis, in other words, the left part and right part thereof are exchanged, and is disposed on the other halved member 35 and joined thereto, as shown in FIG. 12.

Although the inner circumferential surface 23 appears to be discontinuous because the shift of the axis of the hole 33 is exaggerated in the figure, the step in reality has a height of a few tens of micrometers, so it is almost continuous. If the step is a concern, grinding may be performed after joining to smooth the step out.

Note that the method of forming the inner circumferential surface 17 of the bearing housing 9 is not limited thereto; it may be machined in an elliptical shape, or it may be formed by pressing a non-circular member therein.

Furthermore, the floating bush 15 according to the first embodiment may be formed by such a method.

Third Embodiment

Next, a turbocharger 1 according to a third embodiment of the present invention will be described using FIGS. 13 to 15.

In this embodiment, the configuration of the floating bush bearing is different from that according to the first embodiment. Hence, such a different portion will be mainly described here, while omitting overlapping descriptions of the portions having the same configurations as those in the above-described first embodiment. Note that the members that are the same as those in the first embodiment will be denoted by the same reference numerals.

Figure 13:
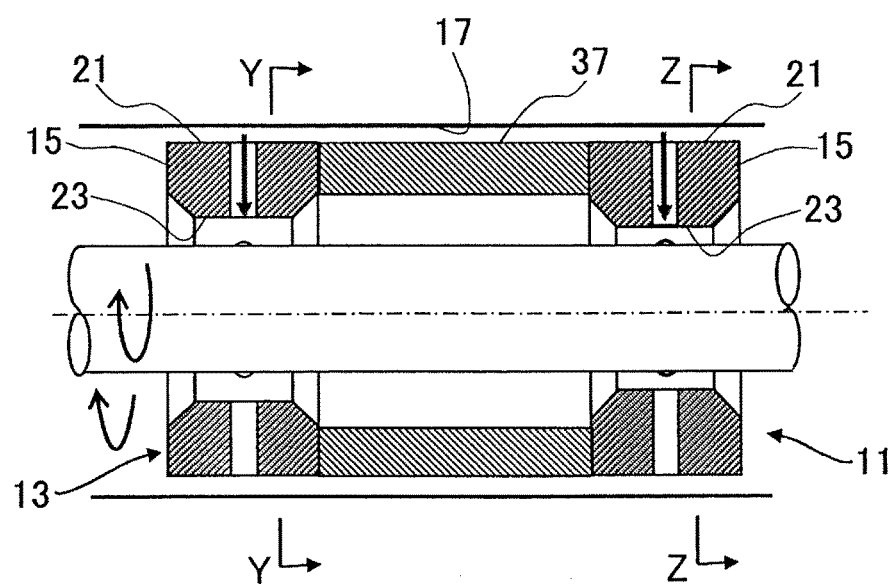
FIG. 13 is a cross-sectional view showing a floating bush bearing according to a third embodiment of the present invention.

FIG. 13 is a cross-sectional view of a floating bush bearing according to this embodiment. FIG. 14 is a cross-sectional view taken along line Y-Y in FIG. 13. FIG. 15 is a cross-sectional view taken along line Z-Z in FIG. 13.

In this embodiment, the turbine-side floating bush bearing 11 and the compressor-side floating bush bearing 13 are joined together by means of a connecting member 37 connecting the floating bushes 15. The floating bush bearings joined in this way are called a "semi-floating bush bearing".

Figure 14:
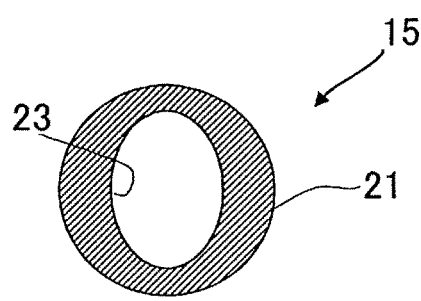
FIG. 14 is a cross-sectional view taken along line Y-Y in FIG. 13.
Figure 15:
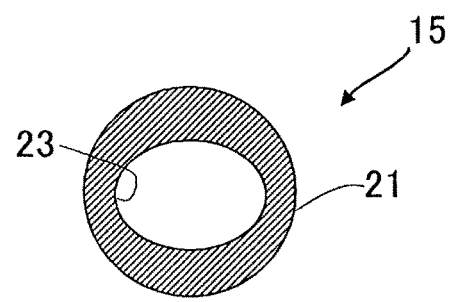
FIG. 15 is a cross-sectional view taken along line Z-Z in FIG. 13.

As shown in FIGS. 14 and 15, the rotational phases of the ellipses formed on the inner circumferential surfaces 23 of the floating bushes 15 are shifted from each other by 90°.

Because the pair of floating bushes 15 are connected together, the floating bushes 15 are rotated together about the rotating shaft 7.

At this time, because the rotational phases of the ellipses formed on the inner circumferential surfaces 23 of the floating bushes 15 are shifted from each other by 90°, the directions in which the force vibrating the rotating shaft 7 act differ between the floating bushes 15. Accordingly, unstable vibration of the rotating shaft 7 can be suppressed by mutual interference.

More specifically, even if the floating bush 15 is located at a position where unstable vibration tends to occur on the compressor-side floating bush bearing 13 side, as in FIG. 14, because it is located at a position where unstable vibration is suppressed on the turbine-side floating bush bearing 11 side, as in FIG. 15, unstable vibration of the rotating shaft 7 can be suppressed.

Note that the present invention is not limited to the above-described embodiments, and it may be variously modified within a scope not departing from the scope of the present invention.

REFERENCE SIGNS LIST 1 turbocharger
3 turbine rotor
5 compressor rotor
7 rotating shaft
9 bearing housing
15 floating bush
21 outer circumferential surface
23 inner circumferential surface
27 cylindrical member
29 hole

The invention claimed is:

1. A turbocharger in which a rotating shaft having a circular cross-section and connecting a turbine rotor and a compressor rotor is supported in a freely rotatable manner, at two axially separated positions via floating bushes, by a support portion disposed so as to surround the rotating shaft in a housing,
   wherein an inner circumferential surface of each of the floating bushes has an elliptical shape in which a curvature of a cross-section varies in a circumferential direction, and
   a pair of the floating bushes are connected together, and phases of the ellipses formed on the inner circumferential surfaces of the floating bushes are shifted from each other.

2. The turbocharger according to claim 1, wherein an inner circumferential surface of the support portion has a non-circular shape in which a curvature of a cross-section varies in a circumferential direction.

3. The turbocharger according to claim 1 wherein the phases of the ellipses formed on the inner circumferential surfaces of the floating bushes are shifted from each other by 90°.

4. A method of manufacturing a floating bush that supports a rotating shaft having a circular cross-section and connecting a turbine rotor and a compressor rotor, the floating bush having an inner circumferential surface that has a non-circular cross-section, the method comprising:
   deforming a cylindrical member into a flattened shape by applying pressing forces to a side surface thereof from two opposing directions with respect to an axis;
   forming a hole having a circular shape centered on the axis so as to penetrate the deformed cylindrical member; and
   removing the pressing forces.

* * * * *